(12) United States Patent
Ogiwara et al.

(10) Patent No.: US 6,805,981 B2
(45) Date of Patent: Oct. 19, 2004

(54) PERPENDICULAR MAGNETIC RECORDING MEDIUM AND PERPENDICULAR MAGNETIC RECORDING-REPRODUCING APPARATUS

(75) Inventors: Hideo Ogiwara, Tachikawa (JP); Takashi Hikosaka, Tokyo (JP); Soichi Oikawa, Yokohama (JP); Hiroshi Sakai, Ichihara (JP); Kenji Shimizu, Chiba (JP)

(73) Assignees: Kabushiki Kaisha Toshiba, Kawasaki (JP); Showa Denko K.K., Tokyo (JP)

( * ) Notice: Subject to any disclaimer, the term of this patent is extended or adjusted under 35 U.S.C. 154(b) by 0 days.

(21) Appl. No.: 09/902,688

(22) Filed: Jul. 12, 2001

(65) Prior Publication Data

US 2002/0039669 A1 Apr. 4, 2002

(30) Foreign Application Priority Data

Aug. 21, 2000 (JP) ........................... 2000-249727

(51) Int. Cl.$^7$ .............................. G11B 5/66; G11B 5/70
(52) U.S. Cl. .......................... 428/694 TS; 428/694 TM; 428/900
(58) Field of Search .......................... 428/694 TS, 900, 428/65.3, 611, 694 TM; 360/97.01

(56) References Cited

U.S. PATENT DOCUMENTS 6,417,991 B1 * 7/2002 Onda ......................... 360/128

FOREIGN PATENT DOCUMENTS

EP   0 860 816 A1   8/1998
JP   11-149628   *   6/1999

* cited by examiner

*Primary Examiner*—Holly Rickman
(74) *Attorney, Agent, or Firm*—Pillsbury Winthrop LLP

(57) ABSTRACT

A perpendicular magnetic recording medium comprising a layer exhibiting a super paramagnetism is used as the underlying film to enable the recording medium to achieve a high density recording with a low noise.

18 Claims, 2 Drawing Sheets

PERPENDICULAR MAGNETIC RECORDING MEDIUM AND PERPENDICULAR MAGNETIC RECORDING-REPRODUCING APPARATUS

CROSS-REFERENCE TO RELATED APPLICATIONS

This application is based upon and claims the benefit of priority from the prior Japanese Patent Application No. 2000-249727, filed Aug. 21, 2000, the entire contents of which are incorporated herein by reference.

BACKGROUND OF THE INVENTION

The present invention relates to a magnetic recording medium used in a peripheral memory device of an electronic computer and used for the recording of image informations and acoustic informations, particularly, to a perpendicular magnetic recording medium for the perpendicular recording system.

With improvement in the performance of an electronic computer, with propagation of the digital system in the image and acoustic data, and with improvement in the information of image, which have been achieved in recent years, a magnetic recording medium for higher recording density has come to be required in various applications such as, particularly, the peripheral recording apparatus of an electronic computer (HDD) and an image data acoustic data recording apparatus (DVTR).

If it is intended to achieve a high density recording by making smaller the recording bit in, for example, the ordinary longitudinal recording, a problem is generated that the coercive force is rendered higher for suppress the thermal decay of the recording bit with the result that the writing by the head became difficult. In order to avoid this problem, proposed in recent years is a perpendicular magnetic recording medium using a perpendicularly magnetized film having a perpendicular anisotropy.

The perpendicular magnetic recording medium used in a perpendicular magnetic recording system comprises in general a soft magnetic underlying film and a perpendicularly magnetized film formed on the underlying film. It is desirable for the soft magnetic underlying film to have a high permeability and a high saturation magnetic flux density. In this medium, however, a domain wall in soft magnetic underlying film is generated, giving rise to an unstability of the recording magnetization such as erasing and demagnetization of the recording data derived from the domain wall migration caused by the external floating magnetic field.

A measure against the domain wall is proposed in, for example, Japanese Patent Disclosure (Kokai) No. 11-149628. It is proposed that a granular structure using fine particles of a hard magnetic material is employed in the soft magnetic underlying film so as to obtain a magnetic recording medium that does not generate a domain wall. However, the soft magnetic underlying film of the particular structure exhibits soft magnetic properties under room temperature and, thus, has a residual magnetization, leading to an inconvenience that a medium noise is generated under the influence of the residual magnetization.

BRIEF SUMMARY OF THE INVENTION

A first object of the present invention, which has been achieved in view of the situation described above, is to provide a perpendicular magnetic recording medium having a low noise and capable of a high density recording.

A second object of the present invention is to provide a perpendicular magnetic recording apparatus having a low noise and capable of a high density recording.

According to one aspect of the present invention, there is provided a perpendicular magnetic recording medium, comprising a nonmagnetic substrate, an underlying film formed on the nonmagnetic substrate, and a perpendicular magnetic layer formed on the underlying film, the underlying film consisting of a layer exhibiting super paramagnetism.

According to another aspect of the present invention, there is provided a perpendicular magnetic recording-reproducing apparatus, comprising a perpendicular magnetic recording medium, driving means for supporting and rotating the perpendicular magnetic recording medium, a magnetic head including an element for recording information in the perpendicular magnetic recording medium and an element for reproducing the recorded information, and a carriage assembly supporting the magnetic head such that the magnetic head is movable relative to the perpendicular magnetic recording medium, wherein the perpendicular magnetic recording medium comprises a nonmagnetic substrate, an underlying film formed on the nonmagnetic substrate and consisting of a layer exhibiting super paramagnetism, and a perpendicular magnetic layer formed on the underlying film.

According to the present invention, it is possible to provide a magnetic recording medium capable of suppressing the noise caused by the residual magnetization and domain wall under room temperature of the underlying film and also capable of achieving a high density recording with a low noise.

The present invention also provides a magnetic recording apparatus capable of suppressing the noise caused by the residual magnetization and domain wall under room temperature of the underlying film and also capable of achieving a high density recording with a low noise.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
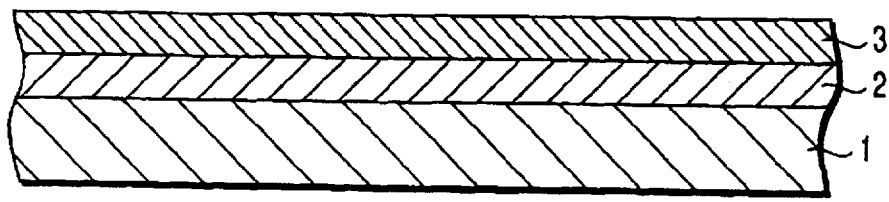
FIG. 1 is a cross sectional view showing as an example the construction of a magnetic recording medium of the present invention.

The perpendicular magnetic recording medium of the present invention has a laminate structure comprising a nonmagnetic substrate, an underlying film formed on the nonmagnetic substrate, and a perpendicular magnetic layer, and the underlying film consists of a layer exhibiting a super paramagnetism.

The present invention also provides a perpendicular magnetic recording-reproducing apparatus using the perpendicular magnetic recording medium referred to above. The perpendicular magnetic recording-reproducing apparatus of the present invention comprises the particular perpendicular magnetic recording medium referred to above, driving means for supporting and rotating the perpendicular magnetic recording medium, a magnetic head including an element for recording information in the perpendicular magnetic recording medium and an element for reproducing the recorded information, and a carriage assembly supporting said magnetic head such that the magnetic head is movable relative to the perpendicular magnetic recording medium.

The underlying film used in the present invention exhibits soft magnetic properties under the cryogenic temperature and paramagnetism under room temperature. It is known to the art that the magnetization reversal time in the recording step is on the order of about $10^{-8}$ second. The magnetic properties effective for this reversal time are not the magnetic properties affected with the thermal decay under the temperature of about room temperature but the magnetic properties not affected with the thermal decay. It follows that the magnetic properties measured under the cryogenic temperature can be regarded as being equivalent to the magnetic properties in the actual recording step in that the magnetic properties do not receive the influence of the thermal decay. To be more specific, the magnetic properties under the cryogenic temperature of 10K can be regarded as the magnetic properties in the actual recording step.

Under the circumstances, it is desirable for the underlying layer used in the present invention to exhibit soft magnetic properties where the magnetization reversal time caused by the magnetic field of the recording head is on the order of $10^{-8}$ second and to exhibit paramagnetic properties where the magnetization reversal time noted above is not shorter than one second. It is also desirable for the underlying film used in the present invention to exhibit soft magnetic properties under the temperature not higher than 10K and to exhibit paramagnetic properties under the temperature around room temperature.

It is more desirable for the underlying film used in the present invention to exhibit a saturation magnetization Ms under the applied magnetic field not higher than 3980 A/m (50 Oe) in respect of the order of $10^{-8}$ second, which corresponds to the reversal time of the magnetic field produced by the recording head, and not to exhibit saturation of magnetization under the applied magnetic field not higher than 776,000 A/m (10,000 Oe) in respect of the order of one second or more.

Alternatively, it is more desirable for the underlying layer used in the present invention to have a saturation magnetization Ms under the applied magnetic field not higher than 5980 A/m (50 Oe) under the temperature not higher than 10K, and not to exhibit saturation of magnetization under the applied magnetic field not higher than 796,000 A/m (10,000 Oe) under room temperature.

As described above, the underlying film used in the present invention performs the function of a soft magnetic film in the recording step and performs the function of a paramagnetic film in the reproducing step. As a result, a sharp recording magnetic field is formed in the recording step. However, since the underlying film used in the present invention is low in its spontaneous magnetization, the underlying film does not act as a source for generating noises such as a spike noise in the step of reproducing the recorded information. In addition, the underlying film used in the present invention is unlikely to receive the influence of the external floating magnetic field.

As described above, in the present invention, a material originally exhibiting soft magnetic properties is used for forming the underlying film. In addition, the particle diameters of the magnetic particles exhibiting a super paramagnetism, which are contained in the underlying film, are controlled appropriately. As a result, it is possible to change the magnetic properties in the recording step and the reproducing step by utilizing the thermal decay.

It is desirable for the super paramagnetic layer constituting the underlying film to consist of, for example, fine particles exhibiting a super paramagnetism of a soft magnetic material or to consist of a granular structure in which fine particles exhibiting a super paramagnetism of a soft magnetic material are dispersed in a nonmagnetic matrix.

The structure consisting of fine particles exhibiting a super paramagnetism of a soft magnetic material can be prepared by using a material system constructed such that micro crystal grains of a soft magnetic material are dispersed in an amorphous material matrix.

On the other hand, the construction consisting of the granular structure in which fine particles exhibiting a super paramagnetism of a soft magnetic material are dispersed in a nonmagnetic matrix such as an oxide or nitride can be prepared by sputtering the nonmagnetic matrix and the soft magnetic material by using, for example, a two system simultaneous sputtering method.

In the present invention, it is desirable for the fine particles exhibiting a super paramagnetism to have a particle diameter not larger than 40 nm. If the film exhibiting a super paramagnetism has a high resistance, it is possible to suppress the eddy current generated when a high frequency recording is performed.

For forming the perpendicular magnetic recording layer on the underlying layer or on the nonmagnetic substrate, it is possible to employ a physical vapor deposition method such as a sputtering method, a vacuum vapor deposition method, a sputtering method within a gas, or a gas flow sputtering method. It is possible to use as a magnetic a ferromagnetic material containing at least one element selected from the group consisting of Co, Fe and Ni. For example, it is possible to use CoPtCr, CoCrTa, CaTaPt, CoNiTa, CoPt and CoPtCr as the ferromagnetic material.

As the material used for forming the layer exhibiting a super paramagnetism of the underlying film, it is possible to use a soft magnetic material containing at least one element selected from the group consisting of Co, Fe and Ni. For example, it is possible to use CoFe, NiFe, CoZrNb, FeZrN and FeTaN.

In the case of the granular structure, it is possible to use as the nonmagnetic matrix a nonmagnetic metal such as Ag, Ti, Ru or C or its compound, or an oxide, a nitride, a fluoride and a carbide. For example, it is possible to use $SiO_2$, SiO, $Si_3N_4$, $Al_2O_3$, AlN, TiN, BN, CaF and TiC.

It is possible for the underlying film to include an optional intermediate layer arranged between the nonmagnetic substrate and the layer exhibiting the super paramagnetism or between the perpendicular magnetic layer and the layer exhibiting the super paramagnetism. It is possible for the intermediate layer to be formed of, for example, RuTi, RuCr or TiN.

If the intermediate layer noted above is formed between the nonmagnetic substrate and the layer exhibiting the super paramagnetism, it is possible to control the crystallinity of the magnetic layer formed thereon as well as the particle diameter and the perpendicular orienting properties of the magnetic particles.

The present will now be described more in detail with reference to the accompanying drawings.

FIG. 1 is a cross sectional view showing the construction of the magnetic recording medium of the present invention. As shown in the drawing, the magnetic recording medium of the present invention is of a laminate structure comprising a nonmagnetic substrate 1, an underlying film 2 formed on the nonmagnetic substrate 1 and consisting of a layer exhibiting a super paramagnetism, and a magnetic layer 3 formed on the underlying film 2.

It is possible to use, for example, a crystallized glass substrate or a reinforced glass substrate as the nonmagnetic substrate 1.

In preparing the magnetic recording medium of the present invention, the underlying film 2 is formed on the nonmagnetic substrate 1 by a DC magnetron sputtering method by using a target consisting of, for example, a soft magnetic material containing at least one element selected from the group consisting of Co, Fe and Ni under an inert gas atmosphere such as an argon gas atmosphere, a neon gas atmosphere or a xenon gas atmosphere. Then, the magnetic layer 3 is formed on the underlying layer 2 by a sputtering method using a target consisting of a ferromagnetic material containing at least one element selected from the group consisting of Co, Fe and Ni under an inert gas atmosphere, thereby forming the magnetic recording medium of the construction shown in FIG. 1.

Figure 2:
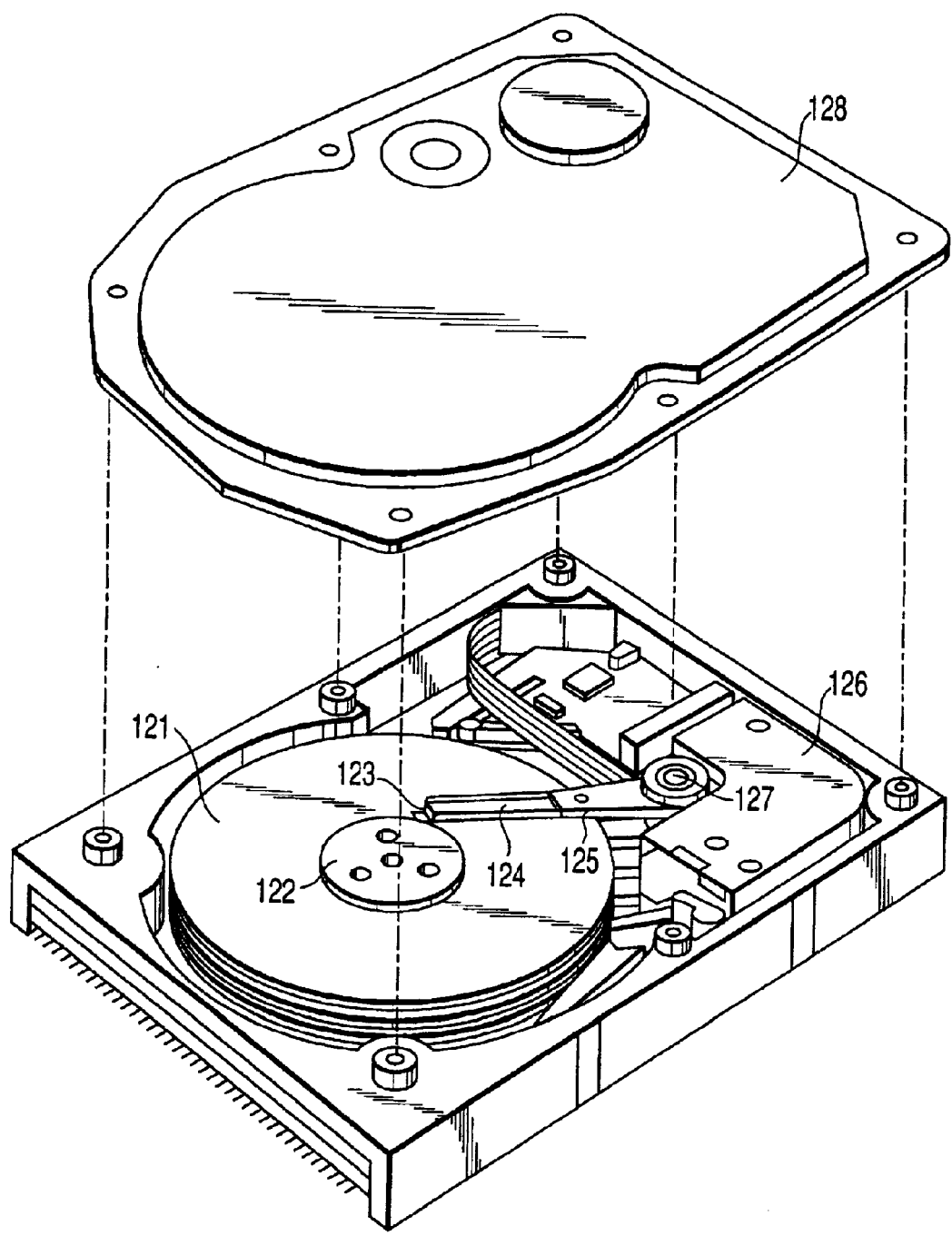
FIG. 2 is an oblique view, partly broken away, showing as an example the magnetic recording-reproducing apparatus of the present invention.

FIG. 2 is an oblique view, partly broken away, showing as an example the construction of a magnetic recording-reproducing apparatus of the present invention. As shown in the drawing, a magnetic disc 12 of a rigid structure for recording information, which is constructed as shown in FIG. 1, is mounted to a spindle 122. The magnetic disc 12 mounted to the spindle 122 is rotated at a predetermined angular speed by a spindle motor (not shown). A magnetic head making access to the magnetic disc 121 for recording-reproducing information is mounted to a slider 123, and the slider 123 is mounted to the tip of a suspension 124 formed of a thin leaf spring. The suspension 124 is connected to one end of an arm 125 having, for example, a bobbin for holding a driving coil (not shown).

A voice coil motor 126, which is a kind of a linear motor, is mounted to the other end of the arm 125. The voice coil motor 126 comprises a driving coil (not shown) wound up around the bobbin portion of the arm 125 and a magnetic circuit consisting of a permanent magnet and a counter yoke arranged to have the driving coil sandwiched therebetween.

The arm 125 is held by ball bearings (not shown) arranged at upper and lower portions of a stationary shaft 127 so as to be rotated and swung by the voice coil motor 126. To be more specific, the position of the slider 123 on the magnetic disc 121 is controlled by the voice coil motor 126. A reference numeral 128 in FIG. 2 denotes a lid.

EXAMPLE 1

Figure 3:
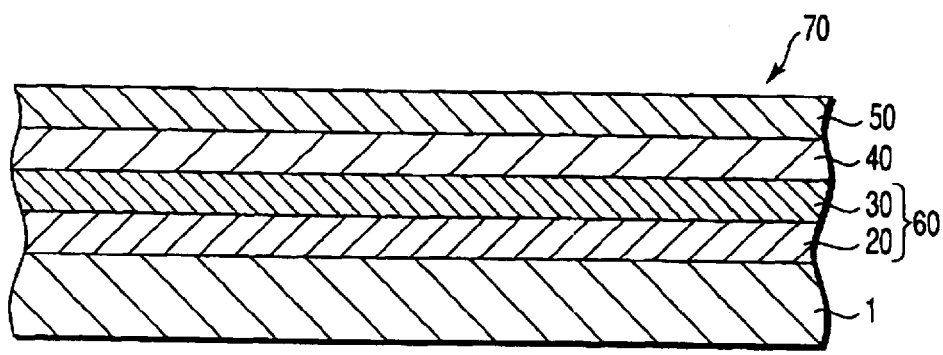
FIG. 3 is a cross sectional view showing as an example the construction of the magnetic recording medium of the present invention.

FIG. 3 schematically shows as an example the construction of a magnetic recording medium 70 of the present invention.

Specifically, the magnetic recording medium 70 of the construction shown in the drawing was prepared by forming a soft magnetic layer 20 exhibiting a super paramagnetism, an intermediate layer 30, a magnetic layer 40, and a protective layer 50 formed of carbon on a 2.5 inch-glass substrate 1, followed by forming a lubricating layer (not shown) on the protective layer 50 by a dip coating method. The soft magnetic layer 20 and the intermediate layer 30 collectively form an underlying film 60.

To be more specific, the underlying film 60 was prepared by forming the soft magnetic layer 20 exhibiting a super paramagnetism by a DC magnetron sputtering method using a FeTaC target under an Ar gas atmosphere, followed by similarly forming a Ru-based intermediate layer 30 on the FeTaC-based soft magnetic layer 20 exhibiting a super paramagnetism, except that used was a Ru target.

Then, the magnetic layer 40 was similarly formed on the resultant intermediate layer 30 by subjecting a CoPtCr-based target to a DC magnetron sputtering treatment under an Ar gas atmosphere having traces of oxygen added thereto. The thickness of the underlying film 60 was 500 nm. The thickness of the intermediate layer 30 was 20 nm. Further, the thickness of the magnetic layer 40 was 25 nm. Also, the protective film 50 was formed on the magnetic layer 40 by a carbon sputtering in a thickness of 10 nm, thereby obtaining sample A.

Incidentally, in order to look into the properties of the soft magnetic layer in sample A, a sample of the soft magnetic layer alone was also formed.

The saturation magnetic field (Hs) and the saturation magnetic flux density (Bs) of sample A thus obtained were measured as the magnetic properties of sample A by using a SQUID (Superconducting Quantum Interference Device) under the condition ranging between the cryogenic temperature and room temperature.

Also, the S/N characteristics (400 kfci (flux change per inch)) of the sample were evaluated by using a spin stand having a flying height of 18 nm using a GMR head having a shield gap length of 0.15 $\mu$m and a read track width of 0.8 $\mu$m, and a single magnetic pole type head having a main magnetic pole thickness of 0.4 $\mu$m and a write track width of 2 $\mu$m. In the evaluation of the electromagnetic conversion characteristics of the soft magnetic layer, the magnitude of the DC noise (Ndc) and the presence or absence of the spike noise were examined.

Table 1 shows the results.

COMPARATIVE EXAMPLE 1

Sample B was prepared as in preparation of sample A, except that, immediately after formation of a soft magnetic layer on a 2.5-inch crystallized glass substrate, the soft magnetic layer was annealed at 400° C. for 5 minutes, followed by allowing the substrate to stand under an Ar gas atmosphere for several minutes and subsequently forming the intermediate layer and the magnetic layer.

A sample of the soft magnetic layer alone was also prepared for sample B in order to look into the properties of the soft magnetic layer.

The magnetic properties of the resultant sample of the magnetic recording medium and the electromagnetic conversion characteristics of the sample of the soft magnetic layer were evaluated as in Example 1. Table 1 also shows the result.

COMPARATIVE EXAMPLE 2

A soft magnetic layer of an FeZrN system exhibiting a super paramagnetism was formed in a thickness of 500 nm by a DC magnetron sputtering method using a FeZr-based target in place of the FeTaC-based target under a mixed gas atmosphere of $N_2$+Ar. Then, immediately after annealing of the soft magnetic layer, a CoCrPt-based magnetic layer was formed in a thickness of 25 nm by a sputtering method using a CoCrPt-based target under an Ar gas atmosphere. Further, a protective film was formed as in preparation of sample A, thereby preparing sample C.

A sample of the soft magnetic layer alone was also prepared for sample C in order to look into the properties of the soft magnetic layer.

The magnetic properties of the resultant sample C of the magnetic recording medium and the electro-magnetic conversion characteristics of the sample of the soft magnetic layer were evaluated as in Example 1. Table 1 also shows the result.

EXAMPLE 2

Sample D was prepared as in preparation of sample A, except that an FeZrO-based soft magnetic layer of a high resistivity exhibiting a super paramagnetism was prepared by a sputtering method using an FeZr-based target under an mixed gas atmosphere of $O_2$ and Ar.

A sample of the soft magnetic layer alone was also prepared for sample D in order to look into the properties of the soft magnetic layer.

The magnetic properties of the resultant sample D of the magnetic recording medium and the electro-magnetic conversion characteristics of the sample of the soft magnetic layer were evaluated as in Example 1. Table 1 also shows the result.

EXAMPLE 3

Sample E was prepared by forming a CoFe—TiN granular soft magnetic layer on a 2.5-inch glass substrate used as a nonmagnetic substrate by a two system simultaneous sputtering method using a $Co_{20}Fe_{80}$-based target and a Ti-based target under a mixed gas atmosphere of $N_2$+Ar while rotating the substrate about a predetermined orbit and about its own axis, followed by forming an intermediate layer, a magnetic layer and a protective layer as in preparation of sample A.

A sample of the soft magnetic layer alone was also prepared for sample E in order to look into the properties of the soft magnetic layer.

The magnetic properties of the resultant sample E of the magnetic recording medium and the electromagnetic conversion characteristics of the sample of the soft magnetic layer were evaluated as in Example 1. Table 1 also shows the result.

TABLE 1

| Measuring tempera- ture Sample | Magnetic properties of magnetic recording medium | | | | electromagnetic conversion properties of magnetic recording medium | |
|---|---|---|---|---|---|---|
| | 10K | | Room temperature | | Room temperature | |
| | Hs (A/m) | Bs (T) | Hs (A/m) | Bs (T) | Ndc ($\mu V_{rms}$) | S/Nm (dB) |
| A | 79 | 1.8 | 0 | — | 4.2 | 26.5 |
| B | 63.2 | 1.7 | 39.5 | 1.5 | 6.2 | 23.1 |
| C | 237 | 1.6 | 79 | 1.4 | 5.9 | 24.4 |
| D | 55.3 | 1.2 | 0 | — | 4.0 | 27.3 |
| E | 79 | 0.8 | 0 | — | 3.9 | 26.5 |

Figure 4:
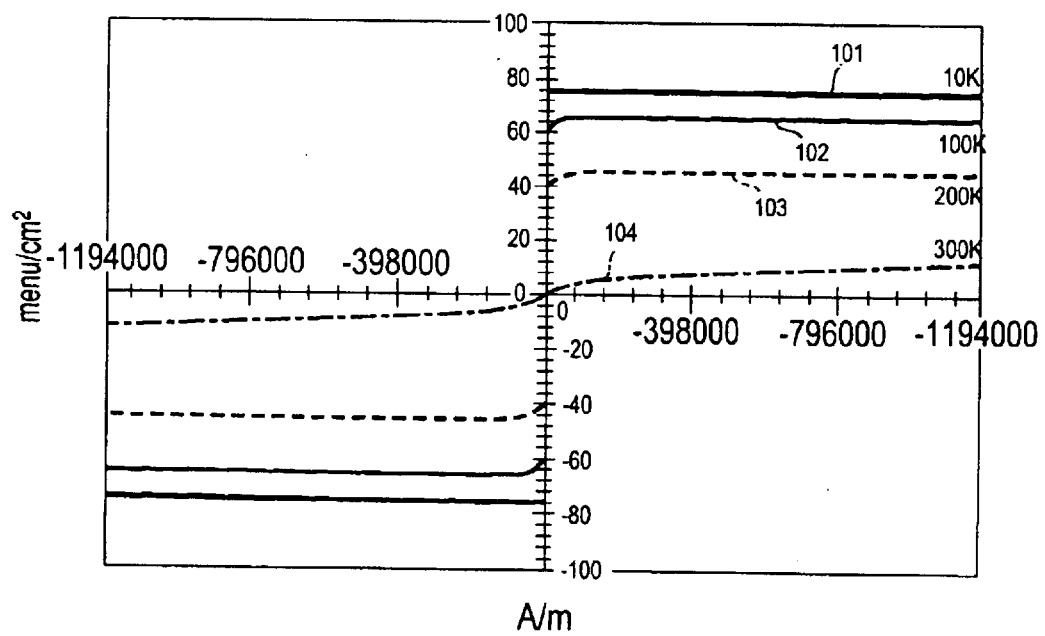
FIG. 4 is a graph showing as an example the M-H magnetization curve of the magnetic recording medium of the present invention.

FIG. 4 is a graph showing the M-H magnetization curves of sample A at 10K, 100K, 200K and 300K. The graphs at 10K, 100K, 200K and 300K are denoted by reference numerals 101, 102, 103 and 104, respectively. As shown in FIG. 4, sample A exhibits a paramagnetism under room temperature and is not saturated even under the range in which the magnetization M is not lower than 776,000 A/m (10,000 Oe). On the other hand, under the cryogenic temperature, the residual magnetization ratio of sample A is close to 1. Also, sample A has a saturation magnetization Ms and exhibits a soft magnetism.

On the other hand, each of samples B and C, in which the soft magnetic layer was annealed, exhibited a saturation magnetization under any of the temperatures measured and exhibited a soft magnetism. Each of the other samples A, D and E exhibited a paramagnetism under room temperature and a soft magnetism under the cryogenic temperatures. It has been found that the soft magnetic particles receive the influence of the thermal decay under temperature close to room temperature so as to exhibit a paramagnetism.

Each of the samples was found to be substantially satisfactory in respect of the S/N of the medium, hereafter referred as S/Nm. However, the sample including the annealed soft magnetic layer exhibited a small value of several dB. The DC noise (Ndc) of the sample of the soft magnetic layer alone was substantially satisfactory. When the noise signal was observed with an oscilloscope, a spike noise was observed in the annealed sample. However, a spike noise was scarcely recognized in the sample other than the annealed sample. Therefore, the spike noise is considered to have diminished S/Nm. Such being the situation, it has been found that the sample other than the annealed sample scarcely gives influences to the noise.

Further, the overwrite characteristics were measured, with the result that every sample exhibited a value not smaller than 30 dB. This clearly supports that the recording was performed satisfactorily. Concerning D50, all the samples exhibited very good values of 280 kfci to 300 kfci.

Still further, the recording frequency was increased from 400 kfci to 600 kfci, with the result that the overwrite was lowered to about 20 dB in the samples other than sample E. When the electrical resistance of the soft magnetic layer was measured by a four terminal method, the samples other than sample E exhibited a low resistivity of several $\mu\Omega m$, though sample E exhibited a high resistivity of about 50 $\mu\Omega m$. It is considered reasonable to understand that the generation of the eddy current under the high frequency was suppressed because the resistance value of the soft magnetic layer was increased, making it possible to achieve a sufficient recording. As described above, it is possible to provide a recording medium satisfactory in the overwrite characteristics in the high frequency recording and exhibiting a high resolution by allowing the soft magnetic layer exhibiting a super paramagnetism to exhibit a high resistivity.

In sample A, a sample that did not include the Ru intermediate layer was prepared so as to evaluate the noise. The sample thus prepared was found to exhibit the overwrite characteristics of 30 dB and a pulse width PW of an isolated read pulse of 14 nm. It is considered reasonable to understand that, since the crystal growth of the magnetic layer is somewhat insufficient, compared with the case where the intermediate layer is used, the sample that did not include the intermediate layer exhibited somewhat low values. Also, the sample that did not include the Ru intermediate layer was found to be substantially equal in noise to sample A.

As apparent from Examples 1 to 3 and Comparative Examples 1 and 2, the magnetic recording medium of the present invention, which includes the underlying film made of a soft magnetic layer exhibiting a super paramagnetism, plays an effective role as a soft magnetic layer in the recording step and exhibits the behavior of a paramagnetic material so as not to give any influence to the noise generation in the reproducing step.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A perpendicular magnetic recording medium comprising:
    a nonmagnetic substrate;
    an underlying film formed on said nonmagnetic substrate; and
    a perpendicular magnetic layer formed on said underlying film,
    wherein said underlying film has a layer exhibiting a super paramagnetism, and the magnetization of said layer exhibiting super paramagnetism is not larger than 20 emu/cm$^2$ when a magnetic field of 796,000 A/m is applied at 300K.

2. The perpendicular magnetic recording medium according to claim 1, wherein said layer exhibiting a super paramagnetism is formed of particles exhibiting a super paramagnetism of a soft magnetic material.

3. The perpendicular magnetic recording medium according to claim 1, wherein said layer exhibiting a super paramagnetism has a granular structure having particles exhibiting a super paramagnetism of a soft magnetic material dispersed in a nonmagnetic matrix.

4. The perpendicular magnetic recording medium according to claim 1, wherein said layer exhibiting a super paramagnetism has a saturation magnetization under the following conditions: applied magnetic field not higher than 3980 A/m in respect of the order of $10^{-8}$ second corresponding to the magnetic field reversal time of a recording head and the magnetization is not saturated under the following conditions: the applied magnetic field not higher than 796,000 A/m relative to the order of one second or more.

5. The perpendicular magnetic recording medium according to claim 1, wherein said layer exhibiting a super paramagnetism exhibits a soft magnetic properties when the temperature is not higher than 10K and exhibits a paramagnetism under ambient temperature conditions.

6. The perpendicular magnetic recording medium according to claim 1, wherein the magnetization of said layer exhibiting a super paramagnetism is not saturated when the temperature is ambient and when the applied magnetic field is not higher than 796,000 A/m, and the layer exhibiting a super paramagnetism has a saturation magnetization when the temperature is not higher than 10K and when the applied magnetic field is not higher than 3980 A/m.

7. A perpendicular magnetic recording-reproducing apparatus comprising:
    a perpendicular magnetic recording medium;
    driving means for supporting and rotating the perpendicular magnetic recording medium;
    a magnetic head including an element for recording information in the perpendicular magnetic recording medium and an element for reproducing the recorded information; and
    a carriage assembly supporting said magnetic head which is movable relative to the perpendicular magnetic recording medium,
    wherein the perpendicular magnetic recording medium comprises:
        a nonmagnetic substrate,
        an underlying film formed on the nonmagnetic substrate and having a layer exhibiting super paramagnetism, and the magnetization of said layer exhibiting super paramagnetism is not larger than 20 emu/cm$^2$ when a magnetic field of 796,000 A/m is applied at 300K and
        a perpendicular magnetic layer formed on the underlying film.

8. The perpendicular magnetic recording-reproducing apparatus according to claim 7, wherein said layer exhibiting a super paramagnetism is formed of particles exhibiting a super paramagnetism of a soft magnetic material.

9. The perpendicular magnetic recording-reproducing apparatus according to claim 7, wherein said layer exhibiting a super paramagnetism has a granular structure having particles exhibiting a super paramagnetism of a soft magnetic material dispersed in a nonmagnetic matrix.

10. The perpendicular magnetic recording-reproducing apparatus according to claim 7, wherein said layer exhibiting a super paramagnetism has a saturation magnetization under the following conditions: the applied magnetic field is not higher than 3980 A/m in respect of the order of $10^{-8}$ second corresponding to the magnetic field reversal time of a recording head and the magnetization is not saturated under the following conditions: the applied magnetic field is not higher than 796,000 A/m relative to the order of one second or more.

11. The perpendicular magnetic recording-reproducing apparatus according to claim 7, wherein said layer exhibiting a super paramagnetism exhibits soft magnetic properties under the temperature not higher than 10K and exhibits a paramagnetism at ambient temperature.

12. The perpendicular magnetic recording-reproducing apparatus according to claim 7, wherein the magnetization of said layer exhibiting a super paramagnetism is not saturated when the temperature is ambient and when the applied magnetic field is not higher than 796,000 A/m, and the layer exhibiting a super paramagnetism has a saturation magnetization when the temperature is not higher than 10K and when the applied magnetic field is not higher than 3980 A/m.

13. The perpendicular magnetic recording medium according to claim 1 wherein said layer exhibiting super paramagnetism contains one soft magnetic material selected from the group consisting of FeTaC, FeZrO, CoFe, NiFe, CoZrNb, FeTaN, and FeZrN.

14. The perpendicular magnetic recording medium according to claim 2, wherein said fine particles has a particle diameter not larger than 40 nm.

15. The perpendicular magnetic recording medium according to claim 3, wherein said nonmagnetic matrix contains one material selected from the group consisting of Ag, Ti, Ru, C, SiO2, SiO, Si3N4, Al2O3, AlN, TlN, BN, CaF and TiC.

16. The perpendicular magnetic recording-reproducing apparatus according to claim 7, wherein said layer exhibiting super paramagnetism contains one soft magnetic material selected from the group consisting of FeTaC, FeZrO, CoFe, NiFe, CoZrNb, FeTaN, and FeZrN.

17. The perpendicular magnetic recording-reproducing apparatus according to claim 8, wherein said fine particles have a particle diameter not larger than 40 nm.

18. The perpendicular magnetic recording-reproducing apparatus according to claim 9, wherein said nonmagnetic matrix contains one material selected from the group consisting of Ag, Ti, Ru, C, SiO2, SiO, Si3N4, Al2O3, AlN, TiN, BN, CaF and TiC.

* * * * *